United States Patent [19]

Bradt

[11] Patent Number: 4,939,859
[45] Date of Patent: Jul. 10, 1990

[54] AIR-LIQUID KINETIC SCULPTURE APPARATUS

[76] Inventor: Gordon E. Bradt, Rt. 2 Box 470, Eureka Springs, Ark. 72632

[21] Appl. No.: 336,781

[22] Filed: Apr. 13, 1989

[51] Int. Cl.$^5$ ............................................. G09F 19/00
[52] U.S. Cl. ....................................... 40/406; 40/407; 40/409; 40/439
[58] Field of Search ................. 40/406, 407, 409, 441, 40/439, 477, 480

[56] References Cited

U.S. PATENT DOCUMENTS

| | | | |
|---|---|---|---|
| 1,741,692 | 12/1929 | Garaja | 40/439 X |
| 1,976,762 | 10/1934 | Barker | 40/407 |
| 3,144,730 | 8/1964 | Johnson | 40/409 X |
| 3,650,056 | 3/1972 | Walton | 40/409 |
| 3,695,607 | 10/1972 | Stouffer | 40/409 X |

*Primary Examiner*—Laurie K. Cranmer

[57] ABSTRACT

A kinetic sculpture apparatus comprising a transparent tank filled with a transparent liquid and an air supply system wherein air bubbles are introduced along the bottom of the container and thus are distributed thorughout the liquid. Immersed in the liquid are a multiple of vessels that are substantially closed on their sides and top, and substantially open on their bottom. The vessels are weighted so that they have a negative buoyancy when holding a small amount of air but will become positively buoyant when they accumulate more air from the rising air bubbles. The vessels are also weighted so that their center of gravity remains below their center of buoyancy even when in a full positive state. The apparatus comprises techniques for releasing the air from the vessels at the top of their rise so that will sink back towards the bottom until they collect more air and rise again. Also techniques are provided for controlling the movement of the individual vessels and arranging certain vessels to move in sequence with others.

7 Claims, 2 Drawing Sheets

AIR-LIQUID KINETIC SCULPTURE APPARATUS

BACKGROUND OF THE INVENTION

The visual display of air bubbles rising through water has proven to have a very attractive and pleasing effect, particularly when lighted from above. This display is most often seen in aquariums, where the bubbles serve the primary function of aerating the water. These rising air bubbles have also been utilized to create extra motion in the aquarium to complement the movement of the fish. One type of extra motion that has been used is the small horizontally axial "water wheel", in which bubbles are released under the wheel causing it to rotate. Another effective technique is the use of a hinged "clam shell", positioned over the bubbles, so that when the shell gathers enough air to become buoyant, it will swing open and release a burst of larger bubbles on a periodic basis.

THE OBJECT AND SUMMARY OF THE INVENTION

The principal object of the invention is to provide an unique and intriguing added kinetic animation to a transparent container of liquid with an array of rising air bubbles. This added animation is achieved with a plurality of submerged vessels that are caused by the air bubbles to rise and fall in a variety of motions. Some of these motions appear to be arbitrary while others occur in a controlled sequential manner.

THE PURPOSE OF THE INVENTION

The purpose of the invention is to create an animated display that can serve as a kinetic sculpture, or in combination with other graphics and configurations, can serve as an attention-getting advertising device. Another purpose of the invention is to create a novelty clock by mounting a clock face with pendulum behind in such a way that it appears to be suspended in the liquid.

A BRIEF DESCRIPTION OF THE DRAWINGS

DETAILED DESCRIPTION

In accordance with the present invention, an animated device is provided as an intriguing and attention-getting kinetic sculpture, or for use as an advertising display.

Figure 1:
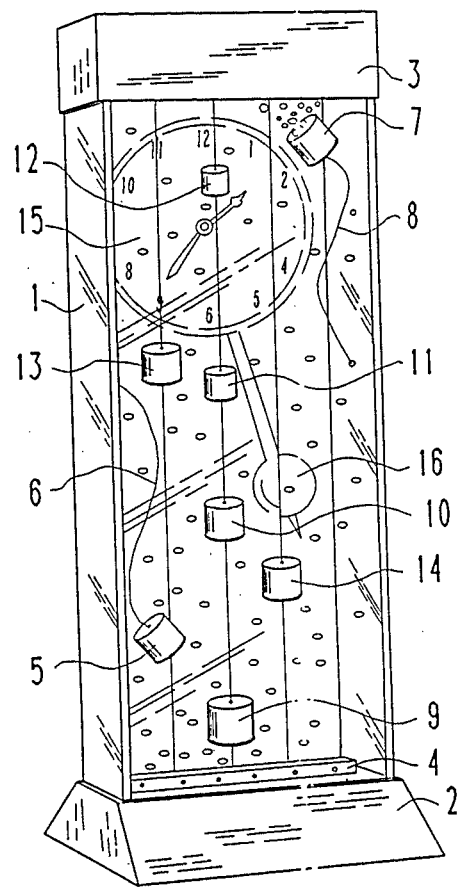
FIG. 1 is a perspective view of the apparatus, taken from the front left, showing the transparent container with its base and top, filled with a transparent liquid, with air bubbles rising through, with the animated vessels dispersed, and the clock with pendulum positioned in the rear.

In FIG. 1, a transparent container 1, having four sides and a bottom, rests in a substantially hollow opaque base 2. The base 2 provides stability to the apparatus as well as providing a place to mount an air supply means such as an aquarium air pump.

The container 1 is filled with a transparent liquid such as water. A top 3 is provided that is opaque and substantially hollow. The main purpose of the top 3 is to contain a lighting means to illuminate the entire contents of the container 1 including the rising bubbles and moving vessels, and the clock face 15 and pendulum 16 mounted behind the container 1.

A manifold 4 is mounted on the inside-bottom of the container 1 with the purpose of releasing bubbles through holes distributed along the length of the manifold 4. Air is supplied to the manifold 4 by means of a transparent tube, not shown, that runs from the air supply means in the base 2, up behind the container 1 and under the top 3, and then down the inside of the container into the end of the manifold 4.

An array of cylindrical vessels 5,7,9,10,11,12,13, and 14 are shown in FIG. 1. The vessels move up and down within the container 1 in a manner to be described in FIG. 2 and FIG. 3.

Figure 2:
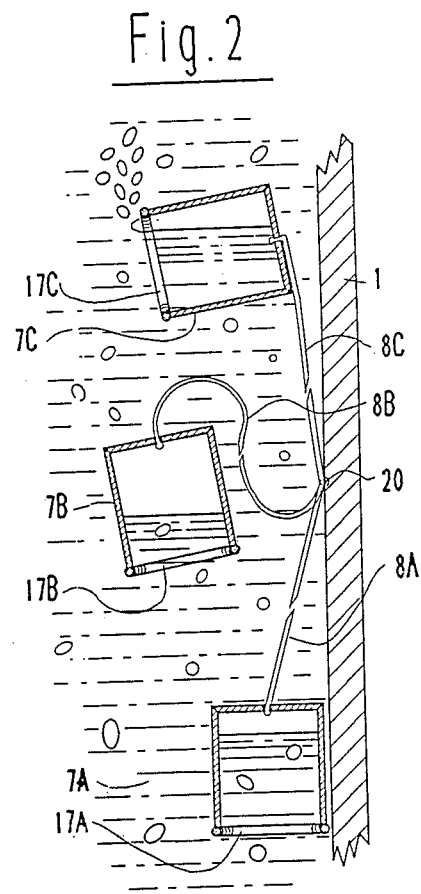
FIG. 2 is an enlarged fragmental longitudinal cross-sectional view through the side of the apparatus, showing one of the tethered vessels in three different conditions.

FIG. 2 shows an enlarged cross-sectional view of one of the vessels 7, from FIG. 1, in three different states of buoyancy and position. The vessel is cylindrical and substantially enclosed on the sides and top, and substantially open on the bottom. A weighted ring 17A,17B, and 17C is fastened around the bottom edge of vessel 7A,7B, and 7C, and is of sufficient weight to make the center of gravity of the vessel to be below the center of buoyancy. Thus, the vessel 7B will position itself with the open end down, even when it is in a fully buoyant state. The vessel 7A with weighted ring 17A is shown in a state of negative buoyancy and is therefore hanging from the tether line 8A which is attached, on one end, to the center of the top side of the vessel 7A, and on the other end, the tether line 8A is attached at the side of the transparent container 1. The tether line 8A is of transparent monofilament construction and is of a very small diameter such that it is not readily visible.

Some of the air bubbles rising in the liquid will enter the open bottom of the vessel 7A and accumulate until the vessel becomes buoyant. The vessel will then start to rise as shown by the condition of vessel 7B. Even in this buoyant condition, the weighted ring 17B keeps the center of gravity below the center of buoyancy. When the vessel rises to the point where all slack is taken out of the tether line 8C, the inertia of the rising motion tips the vessel 7C and releases the trapped air. The condition of vessel 7C is shown just after it has tipped up and is still releasing its trapped air. The vessel has just reached the state of negative buoyancy so that it will immediately start to sink back to the bottom and return to the position of 7A. Once at the bottom, it will start again to accumulate air bubbles and will repeat the cycle of rising and falling.

The tether line 8A,8B, and 8C is shown in a shortened view in FIG. 2, but in practice would be of sufficient length to allow the vessel to travel from near the bottom of container 1 on up to near the top. In FIG. 1, tethered vessel 5 functions similarly to tethered vessel 7 as just described.

Figure 3:
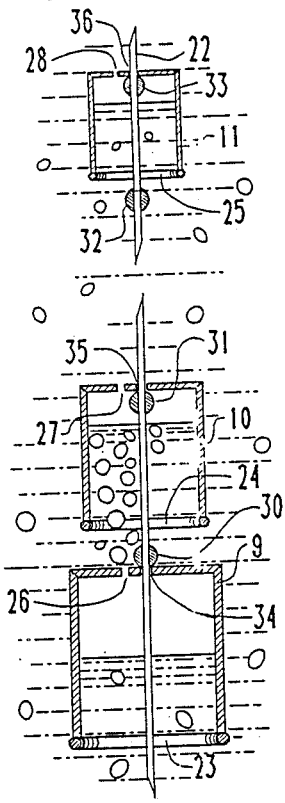
FIG. 3 is an enlarged fragmental longitudinal cross-sectional view through the side of the apparatus, showing three of the vessels in various states of buoyancy.
Figure 4:
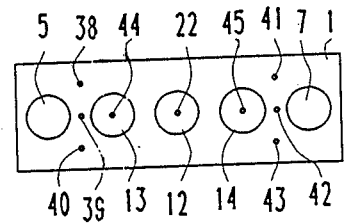
FIG. 4 is a diagrammatic top view of the apparatus showing the container without its top, and the top views of five of the cylindrical vessels, and nine oversized dots representing vertical guide lines which, in practice, are small diameter transparent monofilament lines, that are not readily visible to the viewer of the apparatus.

FIG. 3 shows an enlarged longitudinal cross-sectional view of vessels 9,10, and 11 from FIG. 1. In FIG. 2, and shown diagrammatically in FIG. 4, is a small diameter, transparent, monofilament line 22 that is stretched vertically within the container 1, by an attachment means located at the top and bottom of the container 1 such that the line is taut and approximately equidistant from all four vertical sider. The vessels 9,10, and 11 all have a hole 34,35, and 36 centered in the top. The holes are slightly larger than the diameter of the line 22, but not large enough to allow the escape of air.

The vessels are threaded on to the line alternately with stop balls 30,31,32, and 33. The stop balls are fixed to the line 22 so as to limit the travel of the vessels. For example, stop ball 31 sets the lower limit of travel of vessel 10 and stop ball 32 sets the upper limit.

On the top side of the vessels 9, 10, and 11, are escape valve holes 26, 27, and 28. The function of the escape valve holes are as follows: The hole diameter is small enough that the surface tension of the liquid will not allow the trapped air to escape beyond the point where enough air has accumulated to put the vessel into a positive buoyant state. On the other hand, the escape valve hole is just big enough to allow the escape of the air when the combination of two conditions occur. The first condition is that sufficient air mass has accumulated within the vessel to put it into a fully buoyant state, with the greater air pressure that results from the higher column of air in the vessel. And the second condition is the inertial reaction that occurs when the vessel comes to a sudden stop against the upper stop ball. This inertia of the mass of the water in the lower part of the vessel, when the vessel comes to a sudden stop, puts added pressure on the air pocket resulting in the liquid's surface tension across the hole being broken and releasing a significant portion of the accumulated air mass through the escape hole in a burst of air bubbles. All air is not released in the burst, but enough is released to return the vessel to a non-buoyant condition so that it sinks back down the line until it comes to a stop against the lower stop ball.

In FIG. 3, vessel 9 is shown just as it has come to a stop against stop ball 30 and is in the process of releasing a burst of bubbles out of its release hole 26. This burst of bubbles consequently is rising and entering the open end of vessel 10. Vessel 10 is shown in its condition of negative buoyancy and is therefor hanging from its lower stop ball 31.

As the air escapes from vessel 9 and most of it enters through the bottom of vessel 10, vessel 10 will achieve a positive state of buoyancy and will rise until it comes to a stop against its stop ball 32. Vessel 10 will then release its air up into vessel 11 which will then repeat the process just described for vessel 10.

While a vessel is waiting in a negative buoyant state, it will accumulate some of the randomly rising air bubbles, thus, when the vessel receives the main burst of bubbles from the the vessel coming to a stop just below, it will immediately become buoyant and start it to rise. However, to assure the most regular sequential chain reaction, each vessel in the chain from bottom to top can be made smaller in size from the one below it. This assures that the lower vessel releases more that enough air to put the next vessel up the line into a buoyant state.

The single vessels 13 and 14 in FIG. 1 are of similar construction and function as vessels 9,10, and 11, except they are placed alone on individual vertical lines and have stop balls located to allow them to travel all the way from the bottom of the container to the top. These single vessels 13 and 14 accumulate air directly from the manifold 4, and are not basically effected by air spilled from other vessels. When the vessels 13 and 14 accumulate enough air at the bottom to become buoyant, they travel all the way up the line until they hit their upper stop ball near the top of the container. They function in the same way as vessels 9, 10, and 11, in that the inertia from the sudden stop forces enough air out through their escape hole to put them back in a non-buoyant state so that they sink back down to the bottom and repeat the cycle.

FIG. 4 shows a diagrammatic top view of the container 1, without its top 3, but showing the top sides of the cylindrical vessels 5, 7, 12, 13, and 14. The main purpose of this FIG. 4 is to show the location and purpose of the vertical guide lines. These guidelines are shown by oversized dots at 22, 38, 39, 40, 41, 42, 43, 44, and 45. These represent small diameter, transparent, monofilament lines which would not be readily visible to the observer of the apparatus. These guide lines are stretched vertically within the container 1, by attachment means located at the top and bottom. Guide line 22 has been described in FIG. 3. Guide line 44 guides vessel 13 in FIG. 1 and guide line 45 guides vessel 14 in FIG. 1. Guide lines 38,39, and 40 are positioned with spacing that is smaller than the diameter of tethered vessel 5. This provides a barrier so as to prevent tethered vessel 5 from becoming entangled with guideline 44. Guide lines 41, 42, and 43 similarly serve as a barrier for tethered vessel 7.

The foregoing description and the drawings are given merely to explain and illustrate the invention and the invention is not limited thereto, except insofar as the appended claims are so limited, since those skilled in the art who have the disclosure before them will be able to make modifications and variations therein without departing from the scope of the invention.

What I claim is:

1. In an air-liquid kinetic motion apparatus including an unsealed container with at least one transparent side suitable for viewing into said container, said container filled with a transparent liquid, an air supply means for discharging an array of air bubbles throughout the liquid;

wherein the improvement comprises; vessels submerged in said liquid, said vessels being substantially closed on all their sides except their bottoms which are substantially open, said vessels weighted so that they have a specific gravity less than unity when containing a small amount of air but the weight is limited to allow the vessels to become buoyant when they accumulate a greater amount of air, and said vessels weighted so that their center of gravity remains below their center of buoyancy even when said vessels are in a buoyant state; a lower stop means to position the vessel at the bottom of its travel until it accumulates enough air to become buoyant, an upper stop means to terminate the rise of a buoyant vessel at some point below the surface of said liquid, said upper stop means combined with an escape means for discharging enough air to return the vessel to a non-buoyant state, said escape means functioning without the use of mechanical valves; whereby said vessels rise and fall within said container in a cyclical manner.

2. The apparatus in accordance with claim 1, wherein the upper and lower stop means are comprised of a tether line with one end of said tether line attached to the top of the vessel and the other end of said tether line attached at the side of the container, whereby the vessel, when in a non buoyant state, hangs towards the bottom and collects air bubbles until it becomes buoyant, then rises to the top limit of said tether line and comes to a stop, tipping the the vessel so that it discharges air and becomes non-buoyant, thus sinking back to the bottom where it will repeat the cycle.

3. The apparatus in accordance with claim 2, including vertical barrier guide lines means comprising filaments that are positioned closer to each other than the cross section of the tethered vessel to form a barrier so as to limit the lateral movement of the vessel as it floats up and down on the tether line, whereby said filaments prevent the vessel from becoming entangled with other vessels or their guide lines.

4. The apparatus in accordance with claim 1, including vertical guide line means that limits the lateral movement of the vessel and provide for the mounting of said stop means, such as stop balls or the like, at the upper and lower limits of the vessel's travel.

5. The apparatus in accordance with claim 1, including an escape hole in the top part of the vessel, with the size of said hole being small enough that the surface tension of the liquid prevents air from escaping until such time as the vessel becomes buoyant, rises, and eventually comes to an abrupt stop at the top; and the size of said hole being just large enough that the inertial pressure of the stop will break the surface tension across the hole, thereby allowing enough air to escape through the hole to return the vessel to a non-buoyant state.

6. The apparatus in accordance with claim 5, including the alignment of two or more vessels along one vertical line with the upper stop of the lower vessel being just below the lower stop of the vessel above it, whereby the bottom vessel will release its air into the next vessel up, and that vessel will release its air into the next vessel, and so on in a sequential manner.

7. The apparatus in accordance with claim 6, wherein the lowest vessel is larger than the vessel directly above it, and that vessel is larger than the vessel above it, whereby each vessel will release more than enough air into the next vessel to assure that the next vessel will go promptly into a buoyant state.

* * * * *